United States Patent Office 3,192,123
Patented June 29, 1965

3,192,123
NUCLEAR REACTOR CONTROL DEVICE
Didier Costes, Paris, and Jacques Lebey, Viroflay, France, assignors to Commissariat a l'Energie Atomique, Paris, France
Filed July 25, 1963, Ser. No. 297,572
Claims priority, application France, July 27, 1962, 905,340; June 25, 1963, 939,216
12 Claims. (Cl. 176—86)

This invention relates to nuclear reactor control devices and more particularly to devices of the kind specified which provide a rapid shut-down of the reactor by introducing into the reactor core a neutron absorbing material in divided form. The word "divided" is to be understood as connoting a material in ball or grain or shot or similar form of reduced size and adapted to be poured into an irregularly shaped cavity to fill the same.

The conventional devices of the kind specified mostly comprise a vertical channel disposed in the reactor core, a reservoir placed at a level above core level and having a valve which in some conditions allows the neutron-absorbent substance to drop from the reservoir into the channel, and a system for returning the neutron-absorbent substance to the reservoir. In pressure-gas-cooled reactors, it is known to initiate operation of the valve when the pressure of the heat vehicle circuit drops abruptly. One way of doing this is to use metal bellows whose interior communicates with the heat vehicle circuit via a narrow orifice; the bellows elongate upon an abrupt pressure drop, a predetermined elongation causing the valve to open. Alternatively, a stoppage can be produced by a dirct and voluntary control of the valve. In devices of this kind, the valve is usually of tubular shape and is formed with orifices through which the divided substance—as a rule balls—can pass when the orifices register with other orifices in the reservoir wall. One disadvantage of systems of this kind is that the balls may jam against the sliding wall of the valve, with the possible result that the latter may fail to operate.

Another difficulty inherent in devices of this kind is lifting the balls back into the reservoir to restart the reactor. Most of the known devices require the use of some form of mobile external device placed above the core and having a vertical height substantially the same as the height of conventional control rods. In some other known devices, the balls are raised in the channel by means of a rising stream of the reactor cooling fluid. In these systems, those which comprise an auxiliary piston for supporting the balls run a considerable risk of the balls jamming. In the pistonless devices, a considerable rate of fluid flow is necessary to raise the balls, and so an expensive system of valves and piping must be provided. All of these systems operate on an on-off basis and have no provision for ball raising to be controlled as required and cannot therefore enable operation to be adapted to slow variations in core reactivity. Another disadvantage of the known devices is that a complicated system of fixed piping must often be provided inside the pressure vessel, with the result that a conventional control rod system in an existing reactor cannot readily be replaced by a ball type device.

This invention has as its subject matter a nuclear reactor control device which obviates the disadvantages just outlined and which can readily be fitted to an existing reactor without a larger amount of vertical space being necessary. The nuclear reactor control and shut-down device according to the invention comprises: a vertical channel placed in the reactor core and experiencing a pressure associated with the pressure in the fuel element channels; a reservoir disposed at a level above the level of the vertical channel and adapted to receive a neutron-absorbing substance in divided form; a valve between said reservoir and said channel; and provision for returning the divided material after the same has dropped into the channel. According to the invention, the valve comprises a closure member articulated to the reservoir and applied to its seat by the difference between the pressure in the vertical channel and an adjustable pressure in the reservoir, the value of the last-mentioned pressure being such that, upon a predetermined pressure drop in the vertical channel, the valve opens and the substance drops into the channel. The material return system can comprise a vertical tube which dips down as far as the base of the vertical channel and which is connected at its top end to a chamber disposed above the reservoir, such chamber being connected thereto by way of a lock having two valves, first means being provided to control that of the last-mentioned two valves which is disposed between such chamber and such lock, second means being provided to control that of the last-mentioned two valves which is disposed between the lock and the reservoir, and third means being provided for producing an appropriate negative pressure in said chamber on occasions.

In a device forming another embodiment of the invention, the balls can be shifted by known amounts by means of mechanisms disposed outside the reactor. This second embodiment comprises a system for controlling the volume of balls contained in the reservoir, the system comprising a duct connecting the reservoir to a stock of balls at a higher level, a lock disposed along the duct, and mechanical separating elements which engage around the lock and bound a space for controlling ball volume, and valves for isolating and supplying the lock and adapted to vary the pressure thereof from the reservoir pressure to a pressure near the reactor pressure.

The invention will be more clearly understood from the following description of a number of embodiments of a nuclear reactor control and shut-down device according to the invention, such embodiments being given by way of example only. The embodiments to be described hereinafter are to be considered as forming part of the invention, and, of course, any equivalent steps can be used without departing from the scope of the invention.

The description refers to the accompanying drawings wherein:

FIGURE 5 is a partial view to an enlarged scale showing the elements of the device of FIGURE 3 disposed at the top of a channel, the elements being shown in section along a plane passing through the channel axis and in the arrangement in which they are for normal operation, and FIGURE 6, which is similar to FIGURE 5, shows the elements during disassembly.

Figure 1:
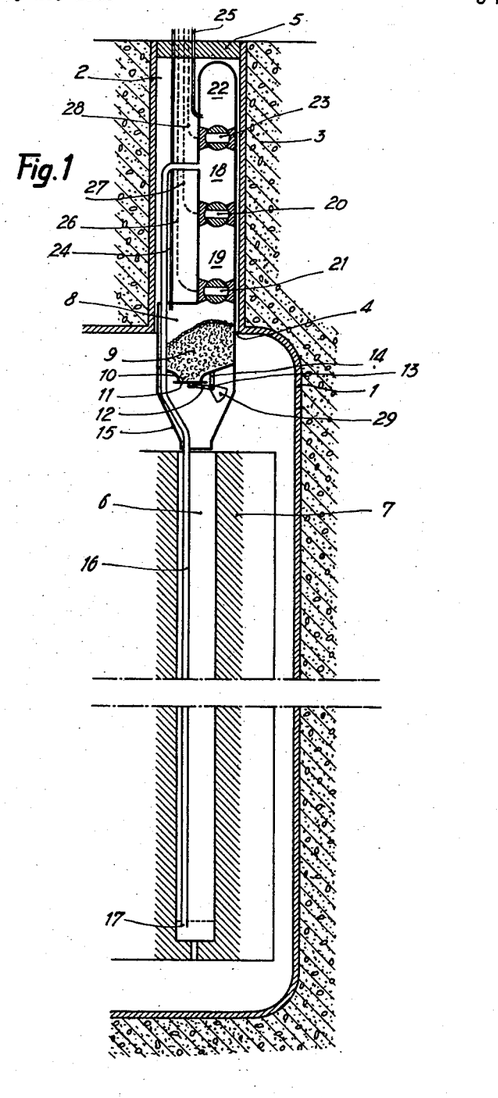
FIGURE 1 illustrates the basic diagram of a device according to the invention.

FIGURE 1 illustrates a part of the biological protection space which is adapted to withstand the pressure P of the cooling fluid; hereinafter it will be assumed that the pressure P is, for instance, 25 bars. The space comprises a concrete caisson 3 lined internally with a sealing-tight skin 1. A well 2 at the top of the caisson 3 opens into the interior of the enclosed space by way of an aperture 4. The well 2, which receives some of the elements according to the invention, is closed at the top by a plug 5. The reactor shut-down device mainly comprises a vertical channel 6 in the reactor core 7, the channel 6 being at the same pressure as the fuel element channels. The device according to the invention also comprises a reservoir 8 disposed above the channel 6. The reservoir 8, which is adapted to receive a neutron-absorbent substance in divided form—shown in the form of balls 9—is formed at the bottom with an orifice 10 which is normally closed by a flap 11. When the flap 11 is opened by the pivoting of a lever 12 articulated to a spindle 13 borne by a bracket 14 rigidly secured to the reservoir 8, the balls 9 can move from the reservoir 8 into the channel 6, which is preferably of rectangular cross-section, via a connecting funnel 15.

A tube 16 narrower than the channel 6 descends therein; the tube 16 is open at its bottom end 17 and is connected at its top end to a chamber 18 disposed above the reservoir 8. The chamber 18 can be connected, by way of a lock 19 and two valves 20, 21, to the reservoir 8 and, by way of a valve 23 to a second chamber 22 known as the low-pressure chamber. By way of ducts diagrammatically indicated by the references 24–28, appropriate pressures can be produced in the reservoir 8 and chamber 22 and the valves 20, 21, 23 can be operated. These valves, although preferably pneumatically operated, can be operated by electrical or just simply by mechanical means.

Automatic dropping of the balls into the channel 6 occurs as follows:

Since the normal pressure P in the enclosure 1 and therefore in the channel 6 is 25 bars and the weight of the balls produces, for instance, a pressure of 1 bar on the flap 11, a pressure P' of 23 bars is maintained in reservoir 8. Flap 11 is therefore kept on its seat because of the difference between the pressures operative on its two surfaces—i.e., 1 bar. If the pressure P in channel 6 drops below 24 bars without any change in the pressure in the reservoir 8, flap 11 opens and the balls drop. Similarly, the balls drop if the pressure in the reservoir 8 is increased to a value P'' greater than 24 bars. Once the balls have dropped, the flap 11 is reclosed by a counterweight 29.

To raise the balls back to the reservoir 8, the pressure therein is restored, for instance, to 23 bars. After a low pressure $p$, for instance, of from 1 to 5 bars has been produced in chamber 22, valve 23 is opened rapidly, with the result that a strong rising stream or current is produced in tube 16. The same is wide enough for the balls to enter its end 17 without jamming. Some of the balls are sucked along by the fluid flow and some travel as far as the chamber 18. Valve 23 is then closed and the pressure in chamber 22 is made negative again. Balls 9 can be transferred from chamber 18 to reservoir 8 by opening and closing first the valve 20 and then the valve 21. These operations are repeated until the balls in the channel 6 are at the required level.

As the foregoing description shows, this device basically needs two pressure-transmitting ducts (24, 25) and three valve controls (26–28)—i.e., a total of five connections when the control system is disposed, for instance, in the reactor control room. Usually, however, it is advantageous for these connections to be as low in number as possible.

Figure 2:
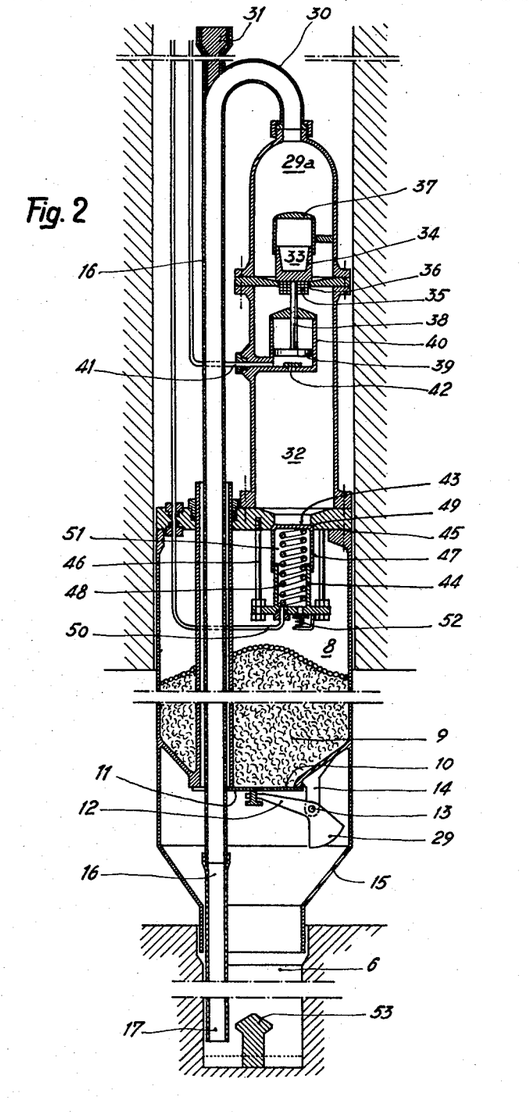
FIGURE 2 diagrammatically illustrates a preferred embodiment of the invention.

FIGURE 2 illustrates a variant of FIGURE 1 and comprises only two control ducts. Like elements have like references. There can be seen inter alia in the second embodiment the channel 6, the top reservoir 8 for the balls 9, the flap 11 and the connecting funnel 15 of the first embodiment. The tube 16 which is, with advantage, embodied as a number of sections which can be screwed together to facilitate positioning is connected at its bent top end 30 to a ball-receiving chamber 29a. The straight part of tube 16 comprises an extension 31 which rises higher than the bend 30 and through which a handling device can be introduced for operations at the bottom of the channel, for instance, in the event of the balls jamming. The extension 31 can have a two-way valve and a flange (neither of which is shown) for connecting a sealing-tight chamber to the extension so that operations can be performed in the channel while the reactor is pressurised. Below chamber 29a is a chamber 32 which, as will be seen hereinafter, is adapted to serve as a "low-pressure" chamber or lock. Chamber 32 therefore corresponds to the two elements 22, 19 of FIGURE 1.

Chambers 29a, 32 can communicate with one another by way of a valve 33 whose closure member 34 normally opens towards chamber 29a—i.e., upwards in FIGURE 2. Closure member or flap 34 has at its base a perforate cylindrical part 35 of the same diameter as the aperture 36 between the two chambers 29a and 32; consequently, when the closure member 34 rises slightly off its seat, fluid can flow through the valve 33 but not any balls. The top part of the closure member 34 extends into a stationary cover 37 which is rigidly secured to the walls of the chamber 29a and which prevents the balls from weighing on the closure member 34 and affecting the operation of valve 33. The same is controlled by means of a rod 38 rigidly connected at one end to the closure member 34 and at the other end to a piston 39 slidable in a cylinder 40 disposed inside chamber 32. By way of a fluid supply duct 41, the pressure in the cylinder 40 can be varied and, therefore, the movements of piston 39 can be controlled; also, fluid can in some cases flow from chamber 32 towards duct 41 via a one-way valve 42. Chamber 32 is disposed immediately above the reservoir 8 and can communicate therewith via a valve 43. The same is formed by two cylinders 44, 47 each closed at one end after the fashion of a cylindrical box and its cover. One of the cylinders, 44, is secured to the top wall 45 of the reservoir 8 by three rods, as 46, the other cylinder 47 forms a flap slidable on the first cylinder. A spring 48 tends to keep the flap or closure member 47 on its seat 49 and keeps the valve 43 in the closed position in normal reactor operating conditions. Via fluid supply duct 50 which extends through the reservoir top wall 45, the pressure in the variable-volume chamber 51 bounded by the two cylinders 44, 47 can be varied; also, fluid can flow freely in some cases from chamber 51 to reservoir 58 via a one-way valve 52.

This device operates as follows:

(1) *Dropping of balls into channel (operation as safety device)*

Since the normal operating pressure is always P=25 bars in channel 6, the pressure in chamber 51 is adjusted by means of duct 50 to be, for instance, P'=23 bars. In this case, the pressure caused by spring 48 should be about 2 bars so as to keep the valve 43 closed while the pressure in chamber 32 stays at 25 bars. The pressure in the reservoir 8 is about 23 bars because of leakages from chamber 51, and closure member 11 stays closed despite the weight of the balls 9. However, if the pressure in chamber 51 decreases (for instance, because of the duct 50 fracturing), valve 43 opens, the pressure in reservoir 8 rises, closure member 11 opens and the balls drop. Similarly, if the pressure in chamber 51 rises after a manual operation, such as increasing the feed pressure in duct 50, the pressure also rises in reservoir 8 via valve 52, the closure member opens and the balls drop. If the pressure in channel 6 drops, the closure member 11 opens and the balls drop. A controlled or automatic drop therefore occurs without mechanical friction and meets safety requirements.

In normal operation of a slight flow of fresh fluid can be added to the chamber 40 via the duct 41; the valve 33 therefore stays half-open and the pressure in the chambers 29a and 32 is slightly above 25 bars (because of leaks from cylinder 40). The spring 48 can be adjusted accordingly.

(2) *Raising of the balls*

The pressure in duct 41 is reduced to a low value, for instance, 5 bars; valve 33 closes and chamber 32 empties via valve 42. Sufficient pressure to unstick valve 33 is then supplied to duct 41. The fluid in chamber 29a and in the channel flows to chamber 32 and entrains balls through the tube 16. To reduce the chances of the balls jamming at the bottom end 17 of tube 16, a mushroom 53 can be provided at the base of channel 6 to prevent all the weight of the balls contained in the channel from being applied to the suction zone. The pressure in chamber 32 increases progressively and is operative on the piston 39 in a direction tending to close the valve 33; clearly, if the same is to stay partly opened some gas must continue to flow through duct 41, and the intensity of the suction applied to the balls is adjusted by variation of the flow of gas through duct 41. When the pressures are substantially balanced at about 25 bars, the balls cease to rise. The valve 33 can then be opened further to allow the balls to drop from chamber 29a into chamber 32.

The pressure in chamber 32 is then adjusted to 23 bars via the duct 41 and valve 42, and the pressure in chamber 51 is adjusted to a low value, for instance 5 bars. Valve 43 opens and the balls move from chamber 32 to reservoir 8.

This cycle of operation is repeated until the level of the balls in the channel 6 has been lowered to the required height.

Of course, the device illustrated in FIGURE 2 comprises biological protection plugs (not shown), detectors for the pressure operative in the two ducts 41, 50 (the detectors are not shown), and so on.

Figure 3:
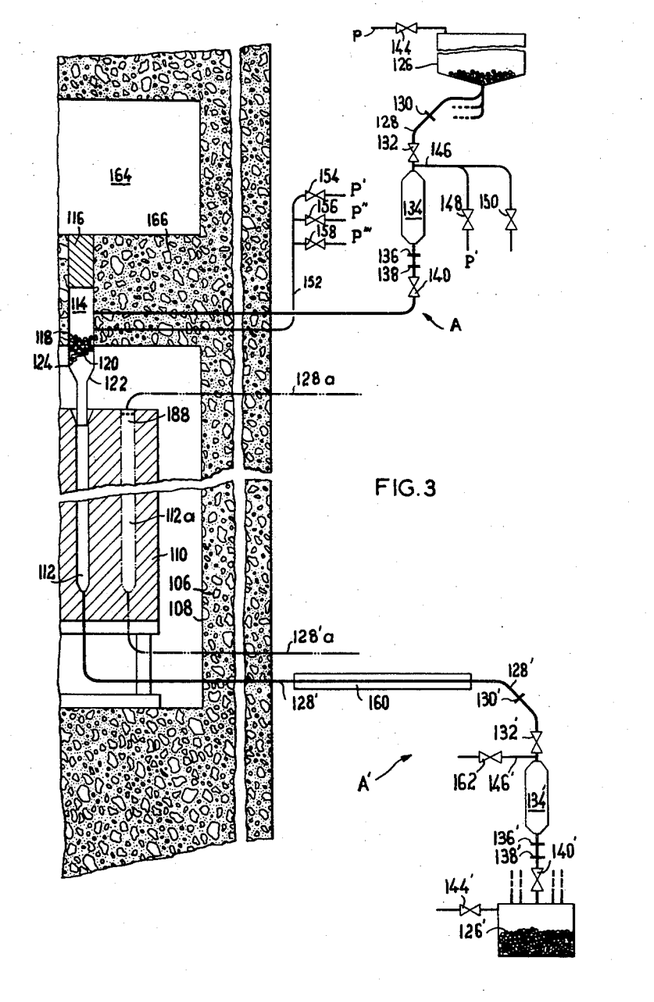
FIGURE 3 is a basic diagram of a device forming another embodiment of the invention.

Referring now to FIGURES 3-6, which illustrate another embodiment of the invention, FIGURE 3 shows a part of the pressure-resistant and biological protection enclosure of a reactor, for instance, in the form of a monolithic concrete construction 106 internally lined with a hermetic skin 108. Inside the enclosure is a core 110 formed by a moderator mass having fuel element channels through which a cooling fluid flows at a pressure P in operation. The moderator also comprises a number of vertical channels, as 112, each having a shut-down device which will now be described. That part of the shut-down device which resembles the part hereinbefore described will be briefly recalled. Such part, which can be seen in FIGURE 3, comprises, in a well 114 contrived in the thickness of the enclosure opposite the channel 112 and closed by a plug 116, a reservoir 118 closed at its bottom end by a closure member 120 balanced by a counter-weight 124. When the reactor is operating normally, the reservoir 118 is occupied by a dosed quantity of absorbent balls. When the closure member 120 opens by pivoting around a spindle rigidly secured to the reservoir 118, balls can move therefrom into the channel 112 through a connecting funnel 122. In addition to that part of the device which has just been briefly described and which is of similar construction to the corresponding part of the first embodiment, there are a top dosing system A and a bottom dosing system A′ of similar construction.

Figure 4:
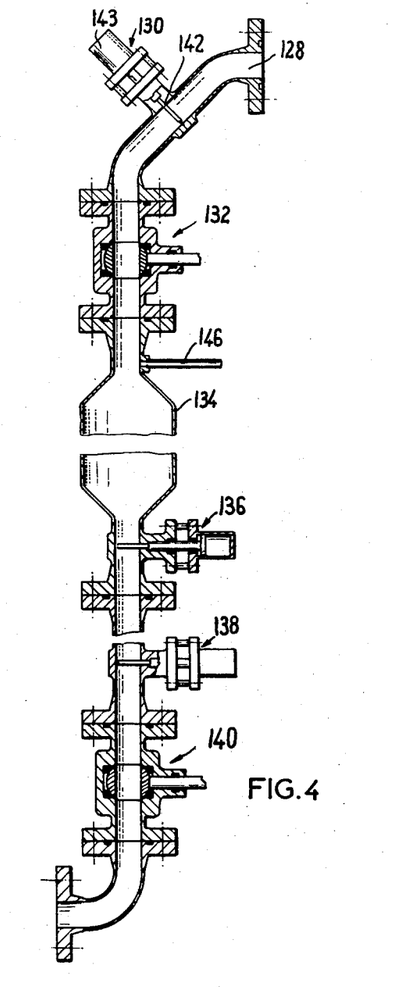
FIGURE 4 is a diagrammatic view in diametric section of the constituent elements of the top ball-controlling or ball-dosing system of the device illustrated in FIGURE 3.

The top dosing system A is diagrammatically illustrated in FIGURE 3 and comprises a supply circuit (some of which is shown in FIGURE 4) and a control circuit. The supply circuit connects the reservoir 118 to a ball storage reservoir 126 which supplies all the circuits and which is placed at a higher level. This circuit comprises, in series along a duct 128 (FIGURE 4), a separator 130, a direct-flow valve 132, a dosing lock 134, two consecutive separators 136, 138 and another direct-passage valve 140. All these elements can be formed by separable independent assemblies interconnected by any means, such as flanges and nuts and bolts. They must be in a descending and, advantageously, vertical arrangement. The separators 130, 136, 138 are formed by closure members whose cover is movable perpendicularly to the direction in which the balls are moved by resilient drive means. A resilient drive is essential in order that a circuit filled with balls may be interrupted. Also, such circuit can be interrupted only when the balls are moving. Since the separators do not provide a sealing-tight closure, they are associated with the direct-flow valves 132, 140 which could not close the duct 128 without risk of jamming when the same is occupied by or giving passage to the balls. The valves 132, 140 are, for instance, of the spherical plug type (FIGURE 4) and are operated by being rotated through 90° by some form of pneumatic control (not shown). The separators are, for instance, thin blades, as 142, operated by pneumatic rams, as 143 (FIGURE 4), although other mechanical or, if the balls are made of a magnetic substance electromagnetic systems can be used.

By means of an associated circuit, the various duct sections can be supplied with fluid of the same nature as the fluid in the reactor (as a rule, carbon dioxide) at different pressures. The ball-storing reservoir 126 has a valve 144 for connecting reservoir 126 to a fluid source at a pressure $p'$ slightly above atmospheric pressure, and for disconnecting the reservoir from such source. A pipe 146 which opens into pipe 128 between valve 132 and lock 139 has two valves 148, 150 which are parallel with one another; the valve 148 experiences a pressure P′ slightly below the reactor operating pressure P, and the valve 150 experiences atmospheric pressure. The pipe 146 has a strainer or some similar device to prevent the balls from entering the valves 148, 150.

The reservoir 118 has an actuating tube 152 (FIGURE 3) comprising three parallel-connected supply valves 154, 156, 158. The valve 154, which is connected to a heat vehicle fluid source at a pressure P′ slightly below the pressure P, is open only during normal reactor operation. The valve 156, which is connected to a fluid source at a pressure P″ considerably less than the pressure P′, is opened only for filling of the reservoir 118. The valve 158, which is connected to a fluid source at a pressure P‴ above the operating pressure P, is opened only to produce a deliberate drop of balls into the channel 112. By way of example, the pressures used can be as follows:

|  | Bars |
|---|---|
| Pressure P in the reactor | 25 |
| Pressure P′ of valves 148 and 154 | 23 |
| Pressure P″ of valve 156 | 20 |
| Pressure P‴ of valve 156 | 27 |
| Pressure $p$ of valve 144 | 2 |

There is sufficient clearance at the bottom end of the funnel 122 for pressure equalisation between the reactor and the channel 112. The relative values of P and P′ are determined in dependence upon that pressure drop in the reactor at which the safety device is required to operate.

The bottom system A′ is similar to the top system A and comprises, in a ball-emptying duct 128′ connecting the bottom of channel 112 to a storage reservoir 126′, a heat exchanger 160 for cooling the balls delivered by the channel, a separator 130′, a direct-flow valve 132′, a lock 134′, two separators 136′, 138′, and a direct-flow valve 140′. The reservoir 126′ can be connected to atmospheric pressure by way of a valve 144′, and duct 128′ can be connected to a source at the pressure $p$ by way of a valve 162 which is connected to duct 128′ by a pipe 146′. Of course, any kind of pneumatic or mechanical mechanism (not shown) can be provided to raise the balls from the bottom system A′ to the top system A.

Figures 5, 6:
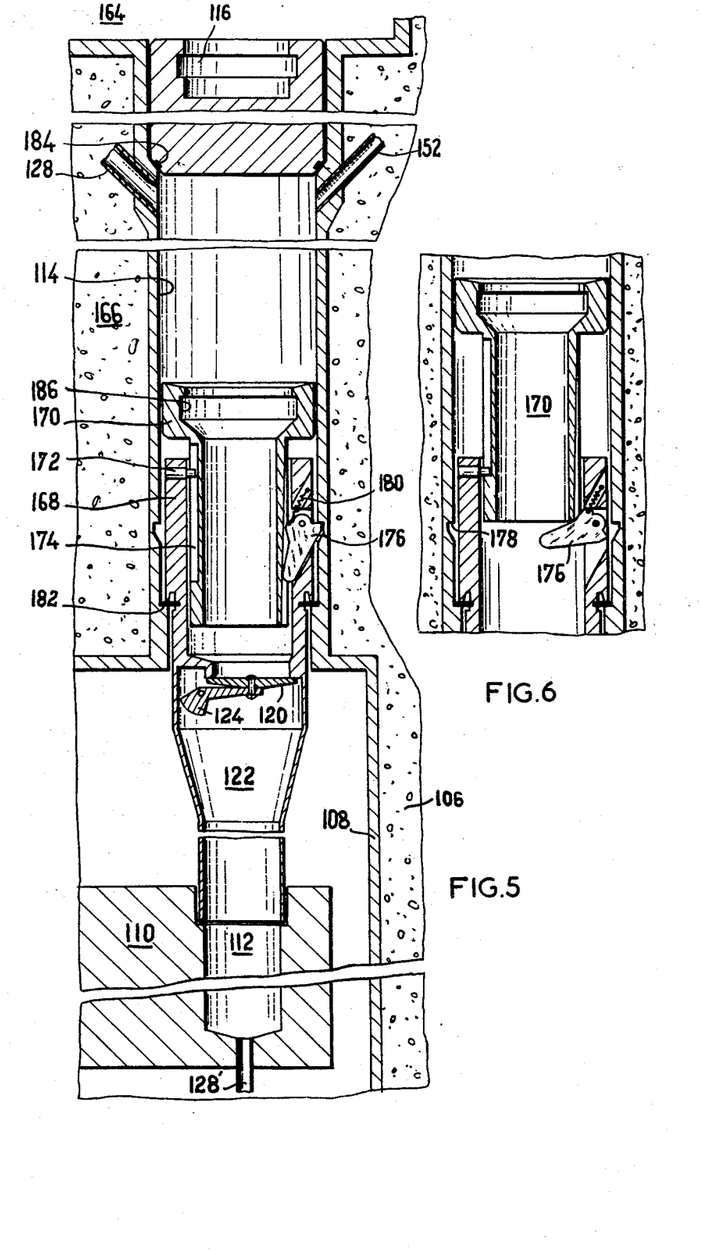

FIGURES 5 and 6 illustrate a preferred but not exclusive embodiment of the reservoir 114 disposed at the top of a reactor channel having an "attic" 164. The same is formed by a chamber which is contrived in the enclosure and which is at a pressure substantially equal to the pressure in the core channels, such chamber being separated from the core compartment by a biological protection screen or slab 166. The reservoir 114 is readily removable and replaceable, for instance, for maintenance or repair work. In this embodiment, the reservoir or receptacle 114 is bounded by a bottom member 168 rigidly secured to the funnel 122 and bearing the rotary closure member 120, and by a locking block 170 comprising a head slidable in the well 114 and a tubular part engageable in the bottom member 168. The same and the block 170 are connected with longitudinal clearance, for instance, by means of fingers 172 which are secured to the member 168 and which engage in elongated recesses 174 in the wall of block 170. When the elements are in position in the well 114, the bottom member 168 is locked in place by a number of pawls 176 which ramps on the outer wall of the block 170 thrust into a groove 178 in the well lining. Return springs 180 disengage the pawls when the block is raised (FIGURE 6). Sealing tightness between the bottom member 168 and the well is provided by means of a gasket 182, and sealing tightness between the well and the plug 116 is provided by a gasket 184 which is compressed by the weight of the plug and as a result of the pressure difference.

In the closed position, visible in FIGURE 5, the pawls 176 convert the radial force (exerted by the inclined ramps of block 170) into an axial force by pivoting around their axis and engaging in groove 178. The force required to clamp gasket 182 is provided by the weight of the block 170 or by an appropriate weight which is placed thereon, then removed.

Once the plug 116 has been removed, the receptacle assembly 114 can be raised by grippers which can be the same as are used for the plug and the fuel elements; the grippers engage in an internal groove 186 in the block 170 and raise the same. The pawls 176 are pivoted by the springs 180 and retracted, the fingers 172 abut the bottom of the straight grooves in the block 170 and move the entire lower part of the device—i.e., the member 168 bearing the closure member 120, the packing 182, the pawls 176 and the connecting funnel 122.

The system just described can be varied to suit the conditions operative in the case where there is no attic and the well 114 opens to atmosphere. In such a case, however, the plug 116 must be mechanically secured to the top part of the enclosure, and the extraction of the plug and of the assembly hereinbefore described must be effected by means of a device contained in a sealing dome which is previously secured to the top part of the weld 114.

The various operating phases of the device just described will now be described with reference more particularly to the diagrammatic FIGURES 3 and 4.

(1) *Dropping of the balls into the channel.*—In the case of the balls dropping because of a pressure drop in the reactor, operation of the device is similar to what is described in FIGS. 1 and 2. During normal operation of the reactor, the reservoir 118 contains balls and experiences a pressure P′ which is below the pressure P in the channel, valve 154 being open and valves 156, 158 being closed. Closure member 120 is kept on its seat by the difference between the pressures P and P′ whose action exceeds the weight of the balls; if, for instance, such pressure differences 2 bars and ball weight corresponds to a pressure of 1 bar, the pressure P in the enclosure must drop by 1 bar—e.g., from 25 to 24 bars—with no variation of the pressure P′ in the reservoir 118, for the closure member 120 to open and for the balls to drop into the channel 112.

The balls can be made to drop arbitrarily by producing a positive pressure in the reservoir 118 as a result of an opening of the valve 158 at the pressure P′′′ and closure of the valve 154 at the pressure P′. Once the balls have dropped the closure member is closed automatically by its counterweight 124 (FIGURE 5). Advantageously, some form of interlock or triggering system is provided to ensure that the channel 112 cannot be emptied until the reservoir 118 has been restocked to ensure that there are always sufficient balls in reserve for reactor safety.

(2) *Filling of the reservoir 118.*—Filling is performed pneumatically, balls being brought in an adjustable quantity first from the storage reservoir 126 into the lock 134, then from the lock into the reservoir 118. The reservoir 126 supplies a number of safety devices, one of which is fully illustrated in FIGURE 3. The priming of the other devices is also shown. At the time when the first stage of filling is about to start, the valves 132, 140, 148, 150 are closed, as are the separators 130, 136, 138. The duct 128 is filled with balls from the reservoir 126 as far as the separator 130. The lock 134 is at atmospheric pressure. The reservoir 126 is kept at the pressure $p$ by the valve 144. The reservoir 118 is kept at the pressure P′′ by opening of the valve 156 and closure of the valves 154, 158. The pressure P′′, which is less than the pressure P′, will subsequently be used to suck the balls from the lock. Valve 132 is opened to produce in the lock 134 a pressure equal to the pressure $p$ in the reservoir 126—for instance, 2 bars. The separator 130 is then operated so that the balls can move to the separator 136. The balls perform this movement by gravity and the movement can be accelerated by a negative pressure produced by a brief opening of the valve 150 connected to a fluid source at atmospheric pressure. Once the lock has been completely filled (in order to control the quantity of balls contained therein), the separator 130 is closed and the separator 136 is opened. The balls drop as far as the level of the separator 138 and release the valve 132 so that the same can close. Of course, the separator 130 can close only when the balls have moved, and so opening of the separator 136 must not be subordinated to closure of the separator 130 although the two operations can be initiated simultaneously.

Once the valve 132 has closed, the second phase of the operation can be performed. The lock 134 is brought to the pressure P′ by the valve 148 being opened, the valve 140, which is on a section of duct free from balls, is opened, whereafter the separator 138 is operated to expel the balls contained in the lock at the pressure P′, towards the reservoir 118 which valve 156 maintains at a pressure substantially of P′′. Once all the balls have been expelled, the valve 148, separator 138 and valve 140 are closed seriatim. The lock 134 can be restored to atmospheric pressure, then isolated, by the valve 150 being opened, then closed.

The sequence of steps just described causes a known quantity of balls to be introduced into the reservoir and is repeated until an appropriate quantity of balls, which can be determined by multiplication of the sequence number by the lock capacity, has entered the reservoir 118. Once the desired quantity of balls has been transferred thereto, the normal operating pressure P′ is restored in the reservoir 118 by closure of valve 158 and by opening of valve 154. During all phases of the operation the opening and closing movements of the valves 132 and 140 always occur when such valves are devoid of balls, and so there is no risk of balls jamming therein.

(3) *Emptying of channel 112.*—For emptying operations, which are similar to the operations for filling the reservoir 118, at the beginning, the valves 132', 140', 162 and the separators 130', 136', 138' are closed and the lock 134' is at the pressure p, for instance, of 2 bars. The emptying duct 128' is filled with balls from the channel 112 as far as the separator 130'; this section comprises the exchanger 160 which reduces the temperature of the balls, after they have been heated in the channel, to a level compatible with operation of the bottom dosing system A'. The pressure P in the lock 134' is then adjusted to the value P, the value already operative in the channel 112, by the valve 132' being opened. The separator 130' is opened, whereafter the valve 162 is opened to suck balls into the lock 134' as far as slide 136'. Upon the termination of ball movement, the valve 162 recloses, whereafter separator 130' is closed and separator 136' opens. The comments hereinbefore made concerning operation of the valves 130 and 136 apply in this case too. The balls disposed between the valves 130' and 136' travel as far as the slide 138' and release the valve 132' and the pipe 146' of the valve 162. The valve 132' can then be closed, whereafter the valve 140' and the slide 138' can be opened. The balls enter the reservoir 126' by gravity, possibly with the assistance of a pressure difference previously produced between the lock 134' and the reservoir 126'. The valve 162, separator 138', separator 136' and valve 140' are then reclosed in that order. These operations are repeated as often as is required either to empty the channel 112 or to leave therein just the amount of balls required. Like the valves 132, 140 of the top dosing system A, the valves 132', 140' are always devoid of balls when they are operated.

(4) *Compensation for slow variations in reactivity.*— In order not to overload the drawing, the compensating circuit is shown in chain-dotted lines in FIGURE 3, associated with a channel 112a different from the channel 112. In the compensating circuit, the ball supply piping 128a extends directly to the top end of the channel 112a, such end having a strainer or the like 188 to prevent the balls from spilling out of the channel. The entire top dosing system and all the operations required to introduce a known quantity of balls into the reactor are identical to the conditions applicable to the filling of the reservoir 118 (safety); however, since the ball-driving pressure must be greater than the presure P operative in the corresponding channel 112a, the valve 148 must allow gas to enter at the adequate pressure P'''.

The bottom dosing system and the operations for emptying the balls are exactly the same for the compensating and safety devices.

Of course, the invention is not limited to the embodiments described and illustrated which have been chosen merely by way of example.

We claim:
1. Nuclear reactor control device comprising a vertical channel in the reactor core subjected to a pressure equal to the pressure in the fuel channels, a reservoir located at a level above the level of the vertical channel adapted to receive neutron-absorbing material in divided form, valve means between the reservoir and the channel comprising a stationary seat, a closure member, means responsive to the difference between the pressure in the vertical channel and an adjustable pressure in the reservoir for holding said closure member on said seat and a system for returning the divided material from the channel to the reservoir, said system comprising a vertical tube which dips down as far as the base of the vertical channel and which is connected at its top end to a chamber disposed above the reservoir, such chamber being connected thereto by way of a lock having two valves, first means being provided to control that of the last-mentioned two valves which is disposed between such chamber and such lock, second means being provided to control that of the last-mentioned two valves which is disposed between the lock and the reservoir, and third means being provided to adjust the air pressure in such chamber to an appropriate value below the value in the vertical channel.

2. A device as set forth in claim 1, characterised in that said first means comprise: a first cylinder; a first piston; and a first duct for supplying fluid to said first cylinder to move said first piston.

3. A device as set forth in claim 1, characterised in that the said second means comprises: a second cylinder; a second piston; a second duct for supplying fluid to said second cylinder to move said second piston; and a spring operative upon said second piston in the same direction as the fluid pressure.

4. A device as set forth in claim 1, characterised in that the valve between the chamber and the lock comprises a perforate flap through which, when the valve is half-open, fluid but not divided material can flow.

5. A device as set forth in claim 1, characterised in that the said third means are the lock, fluid being able to flow under the control of a valve from the lock towards the said first duct, the valve disposed between the chamber and the lock and the said first means.

6. A device as set forth in claim 3, characterised in that the said second cylinder comprises a valve controlling the flow of fluid from the said second duct to the said reservoir.

7. Nuclear reactor control device comprising a vertical channel in the reactor core having a pressure equal to the pressure in the fuel channels, a reservoir located at a level above the level of the vertical channel and adapted to receive neutron-absorbing material in divided form, valve means located between the reservoir and the channel and comprising a stationary seat, a closure member, means responsive to the difference between the pressure in the vertical channel and an adjustable pressure in the reservoir for holding the closing member on the seat and a system for returning the divided material from the channel to the reservoir, said system comprising a duct connecting the reservoir to a stock of material at a higher level, a lock disposed somewhere along the last-mentioned duct, separating elements which surround the lock and which bound a material-dosing space, and valves to control the pressure in the lock and to adjust said pressure at least to a value near the value of the pressure in the material stock and in the reservoir.

8. A device as set forth in claim 7, characterised in that it comprises two separators disposed consecutively between the lock and the valve disposed downstream thereof, the space which is bounded by the two separators being at least equal to the space bounded by the valve disposed upstream of the lock and a separator which precedes the last-mentioned valve.

9. A device as set forth in claim 8, characterised in that the separators are ball stop members adapted to be moved transversely of the duct by resilient drive means.

10. A device as set forth in claim 7, characterised in that it comprises two identical ball-controlling systems disposed the one between the ball stock and the reservoir and the other between the vertical channel and a reserve, means being provided to transfer the balls of the reception stock from the supply balls.

11. Nuclear reactor control device comprising a stationary vertical channel in the reactor core subjected to a pressure equal to the pressure in the fuel channels, a reservoir located at a level above the level of the vertical channel and adapted to receive neutron-absorbing material in divided form, a system for returning said divided material from the vertical channel into the reservoir and valve means located between the reservoir and the channel, said valve means comprising a stationary seat, a closure member, means responsive to the difference between pressures in the vertical channel and an adjustable pressure in the reservoir for applying the closure member on the seat, means for providing three separate values for the adjustable pressure, one value being lower than the normal pressure in the vertical channel to maintain the closure member in closed condition, the second value being greater than the pressure in the vertical channel to forceably open the closure member and the third being a low value for sucking the divided material back to the reservoir.

12. A device as set forth in claim 11, characterised in that it comprises a system for compensating for slow variations in reactivity, such system comprising a ball-controlling system which opens directly into the vertical channel.

References Cited by the Examiner

UNITED STATES PATENTS

| 3,087,884 | 4/63 | Long et al. | 176—86 |
| 3,088,903 | 5/63 | Firth | 176—86 |
| 3,105,033 | 9/63 | Camac | 176—22 |

FOREIGN PATENTS

| 612,009 | 1/61 | Canada. |
| 951,276 | 3/64 | Great Britain. |

CARL D. QUARFORTH, *Primary Examiner.*